(12) United States Patent
Buettner et al.

(10) Patent No.: US 8,621,909 B2
(45) Date of Patent: Jan. 7, 2014

(54) TOOL WEAR COMPENSATION DEVICES AND RELATED MACHINES AND METHODS

(75) Inventors: Stefan Buettner, Markgroeningen (DE); Wolfgang Laib, Besingheim (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 0 days.

(21) Appl. No.: 13/238,447

(22) Filed: Sep. 21, 2011

(65) Prior Publication Data

US 2012/0060580 A1     Mar. 15, 2012

Related U.S. Application Data

(63) Continuation of application No. PCT/DE2010/000315, filed on Mar. 23, 2010.

(30) Foreign Application Priority Data

Mar. 25, 2009    (DE) ................ 20 2009 004 013 U

(51) Int. Cl.
    *B21D 37/00*           (2006.01)

(52) U.S. Cl.
    USPC .............. 72/481.1; 72/470; 83/684; 411/535; 29/468

(58) Field of Classification Search
    USPC ........ 72/481.1, 481.9, 482.2, 482.93, 482.94, 72/470; 235/324; 29/407, 458; 411/13, 14, 411/535, 546; 81/119
    See application file for complete search history.

(56) References Cited

U.S. PATENT DOCUMENTS

| | | | |
|---|---|---|---|
| 3,315,327 A * | 4/1967 | McClarney | 425/110 |
| 4,031,787 A * | 6/1977 | Cady | 83/140 |
| 4,141,264 A * | 2/1979 | Weisbeck | 83/23 |
| RE32,837 E * | 1/1989 | Corni | 235/375 |
| 5,079,978 A * | 1/1992 | Kupfer | 81/119 |
| 5,316,061 A * | 5/1994 | Lee | 144/218 |
| 5,682,665 A * | 11/1997 | Svanberg | 29/458 |
| 5,897,762 A * | 4/1999 | Liu | 205/196 |
| 6,032,505 A * | 3/2000 | Stodd | 72/336 |
| 6,082,227 A * | 7/2000 | Vogel | 81/119 |

(Continued)

FOREIGN PATENT DOCUMENTS

| | | |
|---|---|---|
| CN | 201191479 Y | 2/2009 |
| DE | 2916272 A1 | 11/1979 |

(Continued)

OTHER PUBLICATIONS

Notification of Transmittal of Translation of the International Preliminary Report on Patentability from corresponding PCT Application no. PCT/DE2010/00315, mailed Oct. 6, 2011, 7 pages.

International Search Report for corresponding PCT Application No. PCT/DE2010/000315, mailed Sep. 9, 2010, 3 pages.

*Primary Examiner* — Dana Ross
*Assistant Examiner* — Homer Boyer
(74) *Attorney, Agent, or Firm* — Fish & Richardson P.C.

(57) ABSTRACT

The invention relates to disc-shaped compensation shims for compensating for the shortening of a tool die or a tool stamp due to regrinding. The shim includes a coding indicating a thickness of the tooling shim, the tooling shim being configured for use with a tool die or tool stamp to compensate for shortening of the tool die or tool stamp resulting from regrinding. The invention also relates to tool arrangements having at least one such shim, and to machine tools having such tool arrangements.

17 Claims, 2 Drawing Sheets

(56) References Cited

U.S. PATENT DOCUMENTS

| | | | |
|---|---|---|---|
| 6,248,092 B1 * | 6/2001 | Miraki et al. | 604/96.01 |
| 6,413,086 B1 | 7/2002 | Womack | |
| 6,568,593 B2 * | 5/2003 | Hetzer | 235/385 |
| 6,782,787 B2 * | 8/2004 | Morehead et al. | 83/679 |
| 7,381,015 B2 * | 6/2008 | Jonsson | 407/116 |
| 7,461,593 B2 * | 12/2008 | Hu | 101/4 |
| 7,827,889 B2 * | 11/2010 | Carrier | 83/63 |
| 7,895,724 B1 * | 3/2011 | Dugan | 29/407.01 |
| 2003/0221954 A1 * | 12/2003 | Hsien | 204/232 |
| 2006/0019218 A1 | 1/2006 | Kuo | |

FOREIGN PATENT DOCUMENTS

| | | |
|---|---|---|
| DE | 4417972 A1 | 11/1995 |
| FR | 2424810 A1 | 11/1979 |
| JP | 6106256 A | 4/1994 |
| JP | 2002126831 A | 5/2002 |
| JP | 2006239701 A | 9/2006 |
| JP | 2006239728 A | 9/2006 |

* cited by examiner

TOOL WEAR COMPENSATION DEVICES AND RELATED MACHINES AND METHODS

CROSS-REFERENCE TO RELATED APPLICATIONS

This application is a continuation of, and claims priority under 35 U.S.C. §120 to, PCT Application No. PCT/DE2010/000315 filed on Mar. 23, 2010, which claimed priority to German Patent Application No. 20 2009 004 013.5, filed on Mar. 25, 2009. The contents of both of these priority applications are hereby incorporated by reference in their entirety.

TECHNICAL FIELD

The present invention relates to tool wear compensation devices and related machines and methods.

BACKGROUND

Disk-shaped compensation shims for tooling (e.g., tool dies or tool stamps) are typically used in order to compensate for the material that is removed when the tool is reground after prolonged periods of use to help ensure that the tool die, even after regrinding, terminates flush along an operating plane on which a workpiece to be processed is supported.

A shim for compensating for the regrinding length of a tool die is known from JP 06-106256. The tool die has a through-opening in which a tongue-like region of the shim engages in order to firmly clamp the shim at the lower side of the tool die. In this manner, the reground tool die and the shim can be replaced as a unit.

A similar type of shim is described in JP 2006-239 701. The shim in JP 2006-239 701 includes an additional insert with locking protrusions that engage an opening of a tool die. JP 2006 239 728 also describes a shim that can be clamped on the tool die and is intended to be constructed in such a manner that the resiliently deformable locking protrusions, which engage the through-opening of the die, are prevented from breaking.

JP 2002-126 831 A2 describes a tool die arrangement including a tool die and a ring that is fixed to an upper part region of the tool die. Formed features are fixed along the ring and can store information relating to distinguishing features of the tool die arrangement. Such features may also be formed along the upper side of the tool die.

SUMMARY

In some aspects of the invention, a shim includes a coding that corresponds to the thickness of the shim.

In order to compensate for the shortening of a tool due to regrinding, shims of different thicknesses but otherwise having substantially identical geometry are typically used. Differences in the shim thickness are, however, very difficult to identify due to the small thicknesses of the shims used and the small thickness differences (e.g., in the range of $1/10$ mm) between the individual shims. $1/10$ mm is typically the limit range for recognition with the naked eye. In order to identify the thickness of certain conventional shims, it is typically necessary to pick up the shim by hand prior to use in order to visually inspect the shim and estimate its thickness, which can result in incorrect shims being used. Alternatively, shims can be measured individually prior to use. Since users generally store shims arranged according to thickness (e.g., in various piles or containers), this inspection procedure is often repeated after the shims have been used, which can be quite time-consuming, particularly since incorrect association of the shims within a pile often leads to an error the next time the shims are used. Therefore, after the shims have been fitted, the height of an entire tool die arrangement (i.e., the combined height of the tool die and the shim) is typically measured as a safeguard. However, such a measurement could be omitted from the assembly process if it could be ensured that the shims were chosen correctly.

Due to the small thickness of the shims, it is advantageous for the thickness of shims to be made visually identifiable by applying a coding to the shim, which identifies the shim thickness. The coding can be applied using various techniques. For example, markings of different colors that represent different thicknesses can be applied to the shims, and/or, characters (e.g., letters, figures, symbols, or other identifiable marks) can be printed, engraved, and/or stamped on the shims. The shape of the shims can also be changed to identify the thickness. For example, shims of different thicknesses can have differently shaped inner or outer contours to indicated different thicknesses. In some embodiments, additional contour profiles can be added to the shims to identify their thickness. By using any of the various coding methods described herein, it is possible to ensure accurate visual selection of shims having a desired thickness.

In some embodiments, the coding has at least one coding mark which corresponds to a predefined measurement unit for the shim thickness. In such embodiments, increased shim thickness is denoted with an increased number of coding marks, which allows the shim thickness or the difference between the thicknesses of different shims to be visually established in a relatively simple and repeatable manner.

In some embodiments, the predefined measurement unit of each coding mark is between 0.05 mm and 0.2 mm (e.g., 0.1 mm). Typically, the thinnest shim in a set of shims to be inserted below a tool die has a thickness (e.g., 0.1 mm) that corresponds to the predefined measurement unit. Typically, all the shims included in a set to be used with a tool die have a thickness that is about 1 mm or less.

In some embodiments, each shim thickness is a multiple of the predefined measurement unit, where the multiple corresponds to the number of coding marks of the same shape that are formed on the shim. In this manner, the shim thickness can easily be determined by counting the number of coding marks. For example, when a predefined measurement unit of 0.1 mm is used, a shim having 3 coding marks corresponds to a shim thickness of 0.3 mm.

In some embodiments, the coding can be constructed in the form of a profiled arrangement. This can be advantageous since the profiled arrangement typically has little to no influence on the thickness of the disc, as might be the case with the use of paints or embossing. The profiled arrangement can be applied in a simple manner to a set of shims of different thicknesses.

In some embodiments, the profiled arrangement is formed along the outer edge of the shim and the coding marks are preferably constructed as notches. Due to the application of the profiled arrangement along the outer edge of the shims, the thickness can also be visually detected when the shim is already mounted on a tool die or when multiple shims are stacked on top of each other. The profiled arrangement along the outer edge of the shim can typically be seen from both sides of the shim. Shims that are already fabricated without any coding can simply be provided with a coding, for example, by notches being formed (e.g., machined) into the discs in batches. Alternatively or additionally, it is possible for a profiled arrangement to be formed along the inner edges of the shims.

In some embodiments, the profiled arrangement is applied to the flat face of the shim. The coding marks are typically constructed as through-holes. Due to the coding marks being formed on the face of the shim in the form of through-holes, it can be ensured that the coding marks can be recognized from both sides of the shim. In some embodiments, a profiled arrangement is applied only to one of the shim's flat faces. Due to the typically small shim thicknesses, embossings formed along a face on one side of a shim are generally recognizable as a mirror image along the other side of the shim.

In another aspect of the invention, a tool die arrangement includes a tool die and at least one disc-shaped shim as described herein, which is placed below the tool die in order to compensate for a shortening of the tool die due to regrinding. The geometry of the shim is adapted to the geometry of the tool die and is typically constructed in the form of a circular ring. The ring diameter is generally selected in such a manner that the shim is sized so that it does not protrude into the through-opening which is typically provided in the die and, depending on the application, does not exceed the maximum diameter of the tool die.

In some embodiments, the tool die arrangement includes multiple shims of different thicknesses, the thickness of each shim being a multiple of a predefined measurement unit. In this manner, the regrinding length can be compensated for in multiples of the predefined measurement unit. Therefore, the shims are placed between the die and die plate or die insert and intermediate ring, adapter, or similar tool die structural components, in order to bring the upper edge of the die to be level with the operating plane. A set of shims can, for example, include shims types having thicknesses of 0.1 mm, 0.3 mm and 0.5 mm.

The predefined measurement unit for the smallest shim thickness is typically selected to be so small that regrinding of the tool die by an amount that is less than the predefined measurement unit typically has little disadvantageous effect (e.g., no disadvantageous effect) on the operation of the tool die. Typically, such tool dies are used in machine tools for processing (e.g., cutting and/or shaping) plate-like workpieces (e.g., metal sheets).

The disk-shaped compensation shims and methods described herein can increase the reliability of processes that compensate for a reduction in length of a tool die or tool stamp due to regrinding by applying a visual coding that denotes shim thickness, which makes the shims more efficiently and easily identifiable.

The details of one or more embodiments of the invention are set forth in the accompanying drawings and the description below. Other aspects, features, and advantages of the invention will be apparent from the description and drawings, and from the claims.

DETAILED DESCRIPTION

Figure 1:
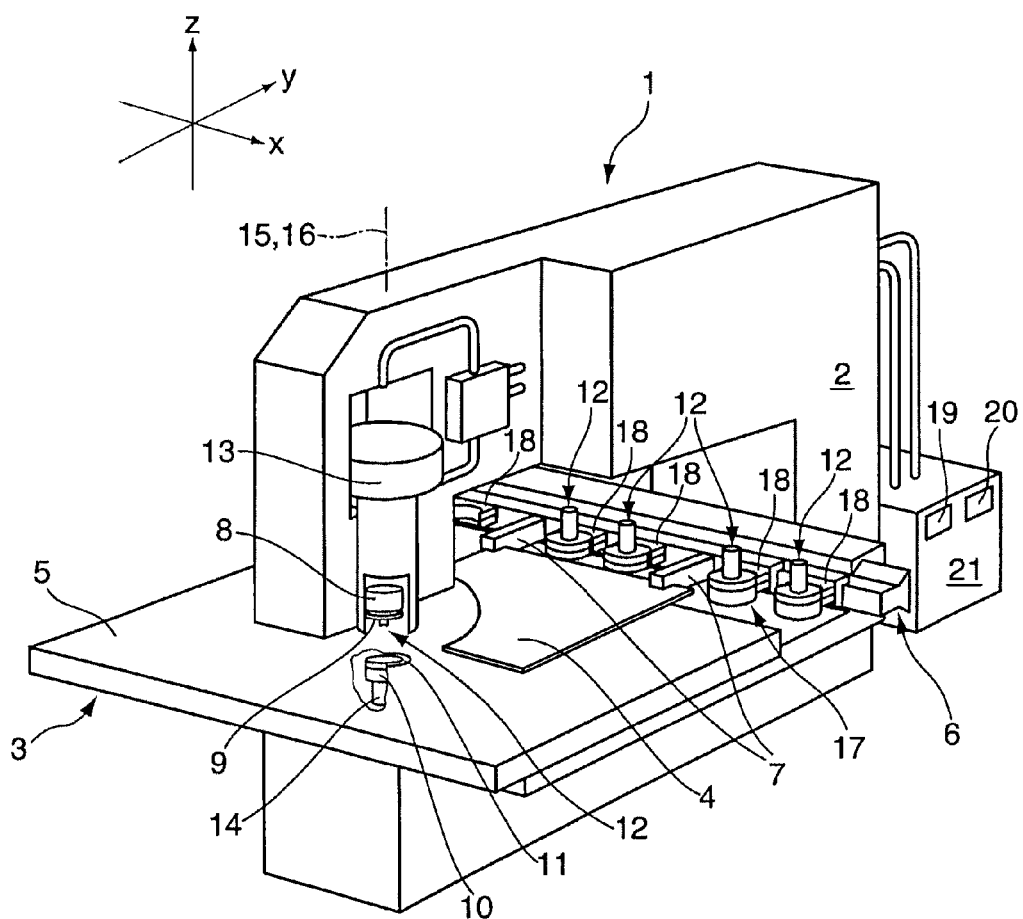
FIG. 1 is a schematic illustration of a machine tool for processing plate-like work pieces.

FIG. 1 illustrates a machine tool 1 for punching and/or shaping plate-like workpieces, such as metal sheets. The punching/shaping machine 1 has a C-shaped machine frame 2 that includes a workpiece support in the form of a workpiece table 3 that serves to support a workpiece (e.g., a metal sheet) 4. At the upper side of the workpiece table 3 a horizontal support plane 5 is formed that extends along an x-direction and a y-direction and supports the metal sheet 4 to be processed. Using a coordinate guide 6, the metal sheet 4, which is clamped to the coordinate guide 6 by collet chucks 7, can be moved along the support plane 5 of the workpiece table 3.

At the front end of the upper member of the C-shaped machine frame 2, a tool stamp receiving member 8 is arranged in which a tool stamp 9 is supported. Additionally, a tool die receiving member 10 in which a tool die 11 is supported is provided at the front end of the lower member of the C-shaped machine frame 2. The tool stamp 9 and the tool die 11, together, form a tool 12 for a separating and/or shaping processing operation of the metal sheet 4.

A drive unit of the punching/shaping machine 1 is formed by a stamp drive 13 and a die drive 14 that are powered by linear drives. Using the stamp drive 13, the tool stamp receiving member 8, together with the tool stamp 9 that is supported or secured thereto, can be raised and lowered along a travel axis 15 with respect to the workpiece table 3. The tool stamp receiving member 8 and the tool die receiving member 10 can also be rotationally adjusted about a tool rotation axis 16, which is identical to the travel axis 15, by a rotary drive.

A linear magazine 17 with additional tools 12 is provided on the co-ordinate guide 6. The tools 12 located along the linear magazine 17 are each retained by a tool cartridge 18 and, depending on requirements, can be secured to the tool stamp receiving member 8 or the tool die receiving member 10 for processing the metal sheet 4.

When a tool is changed and when a workpiece is processed, the drives (e.g., stamp drive 13 and the die drive 14) of the punching/shaping machine 1 are controlled by a numerical control unit 21. The numerical control unit 21 includes a storage device 19 for storing tool data and additional control device 20 in order to measure and control both the lifting, lowering and rotational movements of the tool stamp receiving member 8 and the rotational movements of the tool die receiving member 10 based on the stored data relating to the workpiece 4 and the tool 12.

Figure 2:
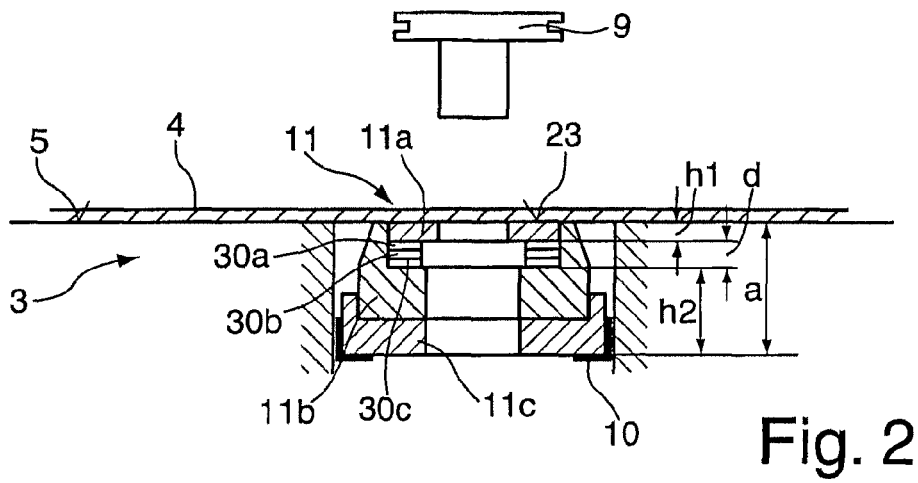
FIG. 2 is a cross-sectional schematic illustration of a tool die arrangement of the machine tool of FIG. 1.

Since the tool die 11 becomes worn along its upper side during use, it typically needs to be reground periodically. Due to the abrasion during regrinding, however, the height of the tool die 11 decreases so that the spacing a (shown in FIG. 2) between the workpiece plane 5 and the tool die receiving member 10 no longer corresponds to the original height of the tool die. As shown in FIG. 2, in order to ensure that the upper side 23 of the reground tool die 11 nonetheless terminates flush along the workpiece plane 5, multiple disc-shaped compensation shims 30a-c are arranged between a die insert 11a and an adapter ring 11b of the tool die 11. The shims 30a-c together have a combined thickness d that corresponds to the distance that the tool die 11 shortened due to regrinding so that the regrinding amount can be compensated for.

If the spacing a between the workpiece plane 5 and the tool die receiving member 10 is, for example, 30 mm and the tool die was shortened by 0.9 mm during regrinding, it has a height h1+h2 of only 29.1 mm. Therefore, the entire thickness d of the shims 30a-c should also be 0.9 mm.

Figure 3A:
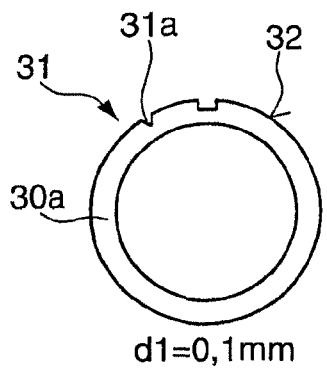
FIGS. 3a-c are schematic illustrations of a set of disc-shaped shims having coding marks in the form of notches.
Figure 3B:
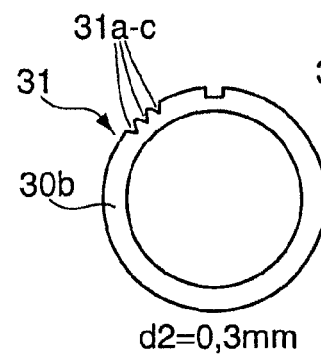
Figure 3C:
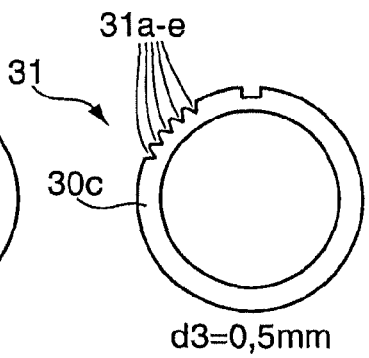

A set of three shims that is suitable for producing the correct overall thickness d is illustrated in FIGS. 3a-c. As shown, the first shim 30a has a thickness d1 of 0.1 mm, the second shim 30b has a thickness d2 of 0.3 mm, and the third shim 30c has a thickness d3 of 0.5 mm. All three circular shims 30a-c also have a rectangular recess in order to prevent the shims from rotating during use.

As can also be seen in FIGS. 3a-c, the shims 30a-c, apart from their respective thicknesses, differ substantially only by a profiled arrangement 31 in the form of triangular notches 31a-e formed along the outer edge 32 of the shims 30a-c. The notches 31a-c act as coding marks for indicating the thickness of each of the shims 30a-c. Each single notch 31a-e corresponds to a measurement unit for the shim thickness, which is 0.1 mm in the illustrated example. Accordingly, on the shims 30a-c, the thicknesses d1 to d3 of 0.1 mm, 0.3 mm, and 0.5 mm are coded by one notch 31a, three notches 31a-c, and five notches 31a-e, respectively. The arrangement of the notches 31a-e along the outer edge of the shims 30a-c allows recognition of the shim thicknesses d1 to d3, even when multiple shims 30a-c of different thicknesses are stacked one on top of the other.

Referring back to FIG. 2, the shims 30a-c can be arranged between the die insert 11a of the tool die 11 and the adapter ring 11b and/or between the adapter ring 11b and a die plate 11c that is secured to the tool die receiving member 10. However, shims that are arranged between the die insert 11a and the adapter ring 11b will typically have a different diameter than those that are arranged between the adapter ring 11b and the die plate 11c. Typically, the shims 30a-c are inserted during preliminary set-up, when the individual components 11a-c of the multi-component tool die 11 are assembled, before being introduced into the tool cartridge 18. The tool die 11 can also include more or fewer individual components.

Figure 4A:
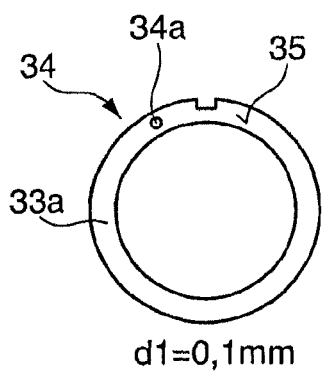
FIGS. 4a-c are schematic illustrations of a set of disc-shaped shims having coding marks in the form of through-holes.
Figure 4B:
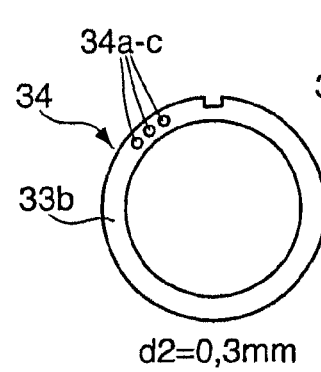
Figure 4C:
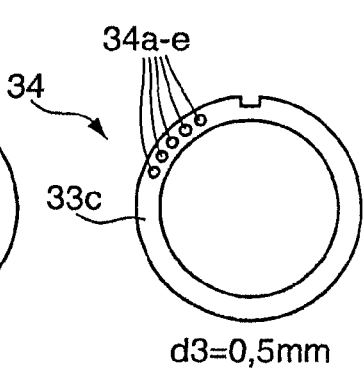

FIGS. 4a-c illustrate another set of shims 33a-c that differs from the set shown in FIGS. 3a-c in that the coding 34 is in the form of holes 34a-e along the end face 35 of the shims 33a-c. The number of holes 34a-e corresponds, in a similar manner to FIGS. 3a-c, to the multiplier by which the predefined measurement unit (e.g., 0.1 mm) is multiplied in order to determine the shim thickness d1, d2, d3. As shown, the holes 34a-e are typically through-holes so that the coding can be read from both sides of the shims 33a-c.

Although the measurement unit has been described as being 0.1 mm, other distances can be selected. The measurement unit is typically in the range between 0.05 mm and 0.2 mm. In some embodiments, coding of the shim thickness on the shims 30a-c, 33a-c is carried out in a manner other than by forming a profiled arrangement. For example, thickness can be identified by selecting a color coding or by applying characters (e.g., figures, letters or symbols) to the shims by, for example, embossing, printing or engraving. It is also possible to differentiate shim thickness using different shaping. For example, different configurations of the outer and inner contours of shims can be chosen to denote different thicknesses.

Using the shim thickness coding methods described herein, it is possible to more easily visually identify the thickness of shims, which can increase the operational reliability when compensating for the shortening of tool dies due to regrinding. Although coded shims have been described above as being used to adjust the position of tool dies, the coded shims and methods described herein can also be used in a similar manner for compensating for the regrinding length of any number of various machine tools, such as a tool stamp or punch of a machine tool.

A number of embodiments of the invention have been described. Nevertheless, it will be understood that various modifications may be made without departing from the spirit and scope of the invention. Accordingly, other embodiments are within the scope of the following claims.

What is claimed is:

1. A tooling shim comprising a coding indicating a thickness of the tooling shim, the tooling shim being configured for use with a tool die or tool stamp to compensate for shortening of the tool die or tool stamp resulting from regrinding, wherein the coding comprises at least one coding mark that corresponds to a predefined measurement unit for the thickness of the tooling shim, and wherein the thickness of the tooling shim is a multiple of the predefined measurement unit that corresponds to a number of coding marks applied to the tooling shim.

2. The tooling shim according to claim 1, wherein the tooling shim is a disc-shaped member.

3. The tooling shim according to claim 1, wherein the predefined measurement unit is from 0.05 mm to 0.2 mm.

4. The tooling shim according to claim 3, wherein the predefined measurement unit is 0.1 mm.

5. The tooling shim according to claim 1, wherein the coding comprises a profiled arrangement.

6. The tooling shim according to claim 5, wherein the profiled arrangement is formed along an outer edge of the tooling shim.

7. The tooling shim according to claim 6, wherein the profiled arrangement comprises coding marks constructed as notches.

8. The tooling shim according to claim 7, wherein each of the coding marks corresponds to the predefined measurement unit for the thickness of the tooling shim.

9. The tooling shim according to claim 5, wherein the profiled arrangement is formed along a flat face of the tooling shim.

10. The tooling shim according to claim 9, wherein the profiled arrangement comprises coding marks constructed as through-holes.

11. The tooling shim according to claim 10, wherein each of the coding marks corresponds to the predefined measurement unit for the thickness of the tooling shim.

12. A tool arrangement, comprising:
a tool die or a tool stamp; and
at least one tooling shim disposed in a manner to adjust the axial position of the tool die or the tool stamp with respect to a workpiece table,
wherein the at least one tooling shim comprises a coding that indicates a thickness of the tooling shim,
wherein the coding comprises at least one coding mark that corresponds to a predefined measurement unit for the thickness of the tooling shim, and
wherein the thickness of the tooling shim is a multiple of the predefined measurement unit that corresponds to a number of coding marks applied to the tooling shim.

13. The tool arrangement according to claim 12, wherein the at least one tooling shim is disposed between an insert of the tool die and an adapter ring of the tool die.

14. The tool arrangement according to claim 12, wherein the at least one tooling shim is disposed between an adapter ring of the tool die and a support plate of the tool die.

15. The tool arrangement according to claim 12, wherein the tool arrangement comprises a plurality of tooling shims of different thicknesses, the thickness of each shim being a multiple of the predefined measurement unit.

16. The tool arrangement according to claim 15, wherein each coding mark represents the predefined measurement unit.

17. A machine tool for processing plate-like workpieces, the machine tool comprising:
a tool arrangement, comprising:
a tool die or a tool stamp; and at least one tooling shim disposed in a manner to adjust the axial position of the tool die or the tool stamp with respect to a workpiece table, wherein the at least one tooling shim comprises a coding that indicates a thickness of the tooling shim, wherein the coding comprises at least one coding mark that corresponds to a predefined measurement unit for the thickness of the tooling shim, and wherein the thickness of the tooling shim is a multiple of the predefined measurement unit that corresponds to a number of coding marks applied to the tooling shim.

* * * * *

UNITED STATES PATENT AND TRADEMARK OFFICE
CERTIFICATE OF CORRECTION

| | | |
|---|---|---|
| PATENT NO. | : 8,621,909 B2 | Page 1 of 1 |
| APPLICATION NO. | : 13/238447 | |
| DATED | : January 7, 2014 | |
| INVENTOR(S) | : Stefan Buettner and Wolfgang Laib | |

It is certified that error appears in the above-identified patent and that said Letters Patent is hereby corrected as shown below:

On the Title page, column 1 item (75), (Inventors), delete "Besingheim, DE" and insert --Besigheim, DE--.

Signed and Sealed this
Thirteenth Day of May, 2014

Michelle K. Lee
*Deputy Director of the United States Patent and Trademark Office*